(12) United States Patent
Ko et al.

(10) Patent No.: US 10,516,867 B2
(45) Date of Patent: Dec. 24, 2019

(54) COLOR CONVERSION DEVICE, DISPLAY DEVICE INCLUDING THE SAME, AND METHOD OF CONVERTING COLOR

(71) Applicant: Samsung Display Co., Ltd., Yongin-Si, Gyeonggi-Do (KR)

(72) Inventors: Junhan Ko, Anyang-si (KR); Jaeshin Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/044,879

(22) Filed: Jul. 25, 2018

(65) Prior Publication Data

US 2019/0132568 A1 May 2, 2019

(30) Foreign Application Priority Data

Oct. 30, 2017 (KR) .......................... 10-2017-0142878

(51) Int. Cl.
| | |
|---|---|
| *H04N 9/77* | (2006.01) |
| *H04N 9/64* | (2006.01) |
| *G06K 9/46* | (2006.01) |
| *H04N 1/62* | (2006.01) |

(Continued)

(52) U.S. Cl.
CPC ............ *H04N 9/77* (2013.01); *G06K 9/4652* (2013.01); *H04N 1/6005* (2013.01); *H04N 1/6027* (2013.01); *H04N 1/628* (2013.01); *H04N 9/64* (2013.01); *H04N 9/643* (2013.01); *H04N 9/68* (2013.01); *G09G 2300/0452* (2013.01)

(58) Field of Classification Search
CPC .. H04N 9/77; H04N 9/64; H04N 9/68; H04N 1/62; H04N 1/60; G06K 9/4652; G06K 9/46
USPC ........ 348/630, 234; 345/207, 591, 619, 690; 358/1.9, 453, 523; 382/298
See application file for complete search history.

(56) References Cited

U.S. PATENT DOCUMENTS 7,221,475 B1 * 5/2007 Ikeda ..................... G03G 15/01
345/619
7,945,092 B2 * 5/2011 Hayashi ................ G06T 11/001
345/591

(Continued)

FOREIGN PATENT DOCUMENTS

| JP | 2009290661 A | 12/2009 |
|---|---|---|
| KR | 1020080054766 A | 6/2008 |
| KR | 1020120054458 A | 5/2012 |

*Primary Examiner* — Jefferey F Harold
*Assistant Examiner* — Mustafizur Rahman
(74) *Attorney, Agent, or Firm* — Cantor Colburn LLP

(57) ABSTRACT

A color conversion device includes a conversion determination module which receives input image data including a plurality of pixel data, and to determine whether a dominant color of an input image represented by the input image data is within a predetermined color conversion region, a color conversion module which performs color conversion on pixel data representing a color within the color conversion region among the plurality of pixel data when the dominant color of the input image is within the color conversion region, and a luminance conversion module which performs luminance conversion on pixel data representing a luminance within a predetermined middle luminance region among the pixel data on which the color conversion is performed.

20 Claims, 10 Drawing Sheets

(51) Int. Cl.
*H04N 9/68* (2006.01)
*H04N 1/60* (2006.01)

(56) References Cited

U.S. PATENT DOCUMENTS

| | | | | |
|---|---|---|---|---|
| 8,885,222 B2* | 11/2014 | Kuno | ............... | G06K 15/188 |
| | | | | 358/3.03 |
| 9,098,915 B2 | 8/2015 | Chuang et al. | | |
| 9,818,047 B1* | 11/2017 | Li | ............... | G06K 9/6267 |
| 2003/0107577 A1* | 6/2003 | Obara | ............... | G06T 1/20 |
| | | | | 345/506 |
| 2004/0085327 A1* | 5/2004 | Jones | ............... | G09B 29/003 |
| | | | | 345/591 |
| 2005/0008258 A1* | 1/2005 | Suzuki | ............... | G06T 3/4015 |
| | | | | 382/298 |
| 2005/0052666 A1* | 3/2005 | Yamamoto | ............... | H04N 1/54 |
| | | | | 358/1.9 |
| 2006/0132849 A1* | 6/2006 | Kakutani | ............... | H04N 1/4057 |
| | | | | 358/3.06 |
| 2007/0269118 A1* | 11/2007 | Sasaki | ............... | H04N 19/70 |
| | | | | 382/232 |
| 2010/0110312 A1* | 5/2010 | Muijs | ............... | H04N 1/6058 |
| | | | | 348/802 |
| 2010/0111414 A1* | 5/2010 | Aragaki | ............... | G06T 5/002 |
| | | | | 382/167 |
| 2010/0188529 A1* | 7/2010 | Tsuruoka | ............... | H04N 5/217 |
| | | | | 348/234 |
| 2010/0238518 A1* | 9/2010 | Fukunaga | ............... | G06K 9/00449 |
| | | | | 358/453 |
| 2012/0176358 A1* | 7/2012 | Kaji | ............... | G09G 3/20 |
| | | | | 345/207 |
| 2013/0342587 A1* | 12/2013 | Nakagawa | ............... | G09G 3/20 |
| | | | | 345/690 |
| 2016/0191745 A1* | 6/2016 | Morikawa | ............... | H04N 1/407 |
| | | | | 358/523 |
| 2016/0273965 A1* | 9/2016 | Fujio | ............... | G01J 3/52 |
| 2018/0086099 A1* | 3/2018 | Yamanobe | ............... | B41J 29/38 |

* cited by examiner

COLOR CONVERSION DEVICE, DISPLAY DEVICE INCLUDING THE SAME, AND METHOD OF CONVERTING COLOR

This application claims priority to Korean Patent Application No. 10-2017-0142878, filed on Oct. 30, 2017, and all the benefits accruing therefrom under 35 U.S.C. § 119, the content of which in its entirety is herein incorporated by reference.

BACKGROUND

1. Field

Exemplary embodiments of the invention relate to imaging technology, and more particularly to color conversion devices, display devices including the color conversion devices, and methods of converting colors.

2. Description of the Related Art

Recently, to provide colors more preferred by users, a display device, or a color conversion device included in the display device which converts a memory color, such as a skin tone, a grass color, a sky color, etc., into a preferred color has been developed. This color conversion device may allow the users to perceive improved image quality by performing the color conversion from the memory color that is sensitive to human eyes into the preferred color that is more preferred by the users.

SUMMARY

Some exemplary embodiments provide a color conversion device that converts an input image into a preferred image by performing not only color conversion but also luminance conversion.

Some exemplary embodiments provide a display device including a color conversion device that converts an input image into a preferred image by performing not only color conversion but also luminance conversion.

Some exemplary embodiments provide a method of converting a color capable of converting an input image into a preferred image by performing not only color conversion but also luminance conversion.

According to an exemplary embodiment, there is provided a color conversion device including a conversion determination module which receives input image data including a plurality of pixel data, and determines whether a dominant color of an input image represented by the input image data is within a predetermined color conversion region, a color conversion module which performs color conversion on pixel data representing a color within the color conversion region among the plurality of pixel data when the dominant color of the input image is within the color conversion region, and a luminance conversion module which performs luminance conversion on pixel data representing a luminance within a predetermined middle luminance region among the pixel data on which the color conversion is performed.

In an exemplary embodiment, the luminance conversion module may not perform the luminance conversion on pixel data representing a luminance within a high luminance region or a low luminance region among the pixel data on which the color conversion is performed.

In an exemplary embodiment, the predetermined middle luminance region may have a minimum luminance value ranging from a bottom 10% of overall luminance values to a bottom 20% of the overall luminance values, and a maximum luminance value ranging from a top 10% of the overall luminance values to a top 20% of the overall luminance values.

In an exemplary embodiment, the luminance conversion module may increase a luminance of the pixel data within the predetermined middle luminance region by a luminance increment that gradually increases as the luminance of the pixel data increases from a minimum luminance value of the predetermined middle luminance region to a reference luminance value and gradually decreases as the luminance of the pixel data increases from the reference luminance value to a maximum luminance value of the predetermined middle luminance region.

In an exemplary embodiment, the luminance increment may increase linearly proportional to an increment of the luminance of the pixel data as the luminance of the pixel data increases from the minimum luminance value to the reference luminance value, and may decrease linearly proportional to the increment of the luminance of the pixel data as the luminance of the pixel data increases from the reference luminance value to the maximum luminance value.

In an exemplary embodiment, the luminance conversion module may increase a luminance of the pixel data within the predetermined middle luminance region using a first luminance conversion equation:

$$y' = \{y^*(p\_tgt - p\_min) - p\_min^*(p\_tgt - p\_ref)\}/(p\_ref - p\_min),$$

when the luminance of the pixel data is greater than or equal to a minimum luminance value of the predetermined middle luminance region and less than a reference luminance value, where y represents the luminance of the pixel data before the luminance conversion, y' represents the luminance of the pixel data after the luminance conversion, p_min represents the minimum luminance value, p_ref represents the reference luminance value, and p_tgt represents a target luminance value of the luminance of the pixel data after the luminance conversion when the luminance of the pixel data before the luminance conversion has the reference luminance value. The luminance conversion module may increase the luminance of the pixel data within the predetermined middle luminance region using a second luminance conversion equation:

$$y' = \{y^*(p\_max - p\_tgt) + p\_max^*(p\_tgt - p\_ref)\}/(p\_max - p\_ref),$$

when the luminance of the pixel data is greater than or equal to the reference luminance value and less than or equal to a maximum luminance value of the predetermined middle luminance region, where p_max represents the maximum luminance value.

In an exemplary embodiment, the luminance conversion module may increase the luminance of the pixel data by applying a weight to a luminance increment according to the first luminance conversion equation or the second luminance conversion equation using a weighting equation:

$$Y = y + \text{weight}^*(y' - y),$$

where Y represents the luminance of the pixel data after the weight is applied.

In an exemplary embodiment, the weight for the luminance increment may be a previously set constant.

In an exemplary embodiment, the weight for the luminance increment may be determined in proportion to an amount of the color conversion for the pixel data.

In an exemplary embodiment, the luminance conversion module may increase a luminance of the pixel data within the predetermined middle luminance region using a luminance conversion equation that is a quadric function.

In an exemplary embodiment, the luminance conversion equation may be:

$$y'=p\_coef*y^2+(1-p\_coef*p\_max-p\_coef* p\_min)*y+p\_coef*p\_max*p\_min,$$

where y represents the luminance of the pixel data before the luminance conversion, y' represents the luminance of the pixel data after the luminance conversion, p_min represents a minimum luminance value of the predetermined middle luminance region, p_max represents a maximum luminance value of the predetermined middle luminance region, and p_coef represents a coefficient parameter.

In an exemplary embodiment, the conversion determination module may determine whether colors represented by the plurality of pixel data are within the color conversion region, compares a number of pixel data representing the colors within the color conversion region among the plurality of pixel data with a reference pixel number, and determines that the dominant color of the input image is within the color conversion region when the number of pixel data is greater than or equal to the reference pixel number.

In an exemplary embodiment, the conversion determination module may include a color space conversion unit which converts the plurality of pixel data that are first color space data into second color space data including luminance data and color data that are separate from each other, a conversion region determination unit which determines whether colors represented by the plurality of pixel data are within the color conversion region based on the color data of the second color space data, and a conversion determination unit which determines whether the dominant color of the input image is within the color conversion region by comparing a number of pixel data representing the colors within the color conversion region among the plurality of pixel data with a reference pixel number.

In an exemplary embodiment, the conversion determination module may divide the input image data corresponding to one frame into a plurality of section data corresponding to a plurality of sections, may extract respective dominant colors of the plurality of section data, determines whether the respective dominant colors of the plurality of section data are within the color conversion region, may compare a number of section data representing the respective dominant colors within the color conversion region among the plurality of section data with a reference section number, and may determine that the dominant color of the input image is within the color conversion region when the number of section data is greater than or equal to the reference section number.

In an exemplary embodiment, the conversion determination module may include a dominant color extraction unit which divides the input image data corresponding to one frame into a plurality of section data corresponding to a plurality of sections, and extracts respective dominant colors of the plurality of section data, a conversion region determination unit which determines whether the respective dominant colors of the plurality of section data are within the color conversion region, and a conversion determination unit which determines whether the dominant color of the input image is within the color conversion region by comparing a number of section data representing the respective dominant colors within the color conversion region among the plurality of section data with a reference section number.

In an exemplary embodiment, the color conversion module may perform the color conversion by moving the color of the pixel data within the color conversion region toward a target color along a line connecting the color of the pixel data and the target color in a chrominance plane.

In an exemplary embodiment, the color conversion module may perform the color conversion by moving the color of the pixel data within the color conversion region in a direction of a vector from a reference color to a target color in a chrominance plane.

In an exemplary embodiment, the color conversion device may further include a parameter storage module which stores at least one parameter used in the color conversion and the luminance conversion.

According to an exemplary embodiment, there is provided a display device including a display panel including a plurality of pixels, a data driver which provides data signals to the plurality of pixels, a gate driver which provides gate signals to the plurality of pixels, and a timing controller which controls the data driver and the gate driver, the timing controller including a color conversion device. The color conversion device includes a conversion determination module which receives input image data including a plurality of pixel data, and determines whether a dominant color of an input image represented by the input image data is within a predetermined color conversion region, a color conversion module which performs color conversion on pixel data representing a color within the predetermined color conversion region among the plurality of pixel data when the dominant color of the input image is within the predetermined color conversion region, and a luminance conversion module which performs luminance conversion on pixel data representing a luminance within a predetermined middle luminance region among the pixel data on which the color conversion is performed.

According to an exemplary embodiment, there is provided a method of converting a color. In the method, it is determined whether a dominant color of an input image represented by input image data including a plurality of pixel data is within a predetermined color conversion region, color conversion is performed on pixel data representing a color within the predetermined color conversion region among the plurality of pixel data when the dominant color of the input image is within the predetermined color conversion region, and luminance conversion is performed on pixel data representing a luminance within a predetermined middle luminance region among the pixel data on which the color conversion is performed.

As described above, the color conversion device, the display device and the method of converting the color according to example embodiments may perform not only the color conversion on the pixel data representing the color in the color conversion region, but also the luminance conversion on the color-converted pixel data, thereby converting the input image into the image that is more preferred by the user.

Further, in performing the luminance conversion, the color conversion device, the display device and the method of converting the color according to example embodiments may not perform the luminance conversion in the high and low luminance regions, and may perform the luminance conversion only in the predetermined middle luminance region, thereby further improving the image quality by preventing the image quality degradation in the high and low luminance regions.

BRIEF DESCRIPTION OF THE DRAWINGS

Illustrative, non-limiting exemplary embodiments will be more clearly understood from the following detailed description in conjunction with the accompanying drawings.

DETAILED DESCRIPTION

Figure 1:
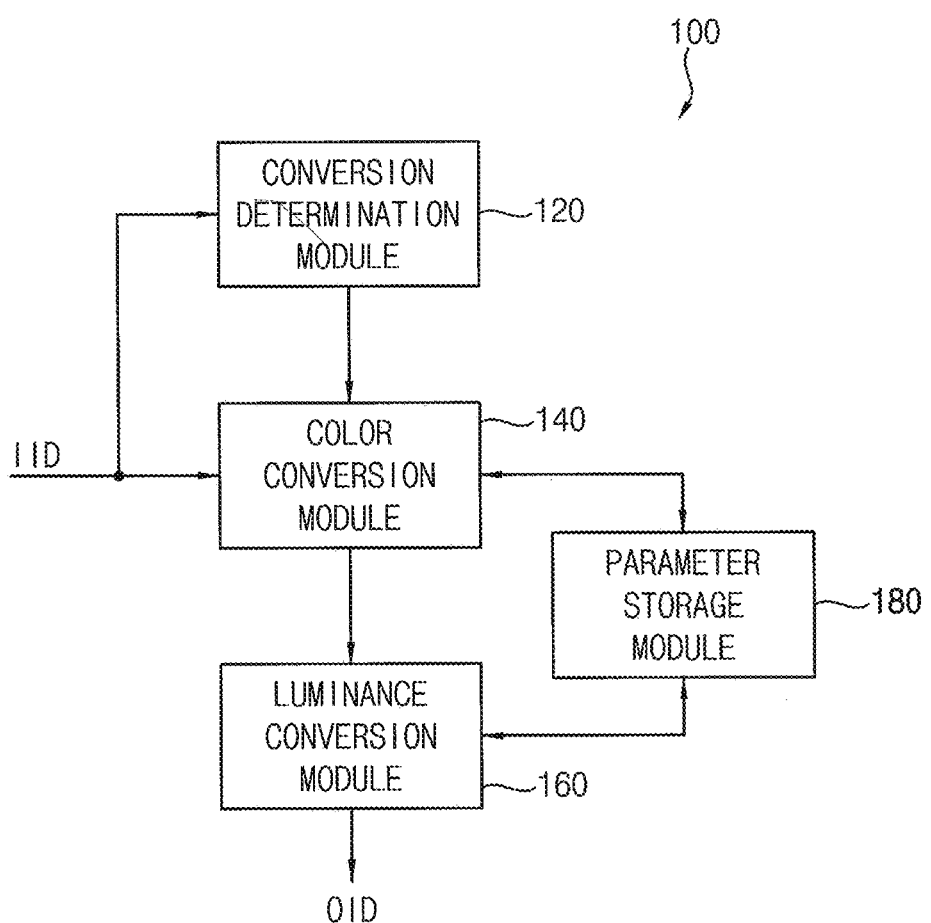
FIG. 1 is a block diagram illustrating an exemplary embodiment of a color conversion device.

Hereinafter, embodiments of the invention will be explained in detail with reference to the accompanying drawings. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating a color conversion device according to exemplary embodiments.

Referring to FIG. 1, a color conversion device 100 according to exemplary embodiments may include a conversion determination module 120 that determines whether to perform color conversion and luminance conversion, a color conversion module 140 that performs the color conversion, and a luminance conversion module 160 that performs the luminance conversion. In some exemplary embodiments, the color conversion device 100 may further include a parameter storage module 180 that stores at least one parameter used in the color conversion and the luminance conversion.

The conversion determination module 120 may receive input image data IID including a plurality of pixel data, and may determine whether a dominant color of an input image represented by the input image data is within a predetermined color conversion region. Here, the input image data IID may be image data corresponding to one frame, and the plurality of pixel data may be data corresponding to a plurality of pixels included in a display panel. In some exemplary embodiments, the input image data IID or the plurality of pixel data may be red, green and blue ("RGB") data. However, the invention is not limited thereto, and the input image data IID or the plurality of pixel data may be various other color data. Further, the color conversion region may be a chrominance region where the color conversion is to be performed. In an exemplary embodiment, the color conversion region may include a region of a memory color of a natural object, such as a skin, a grass, a sky, etc., a region of a color sensitive to human eyes, or the like, for example. In some exemplary embodiments, the conversion determination module 120 may determine whether a color represented by each pixel data is within the color conversion region, and may determine whether the dominant color of the input image is within the color conversion region based on the number of the pixel data representing the colors within the color conversion region. In other exemplary embodiments, the conversion determination module 120 may divide the input image data IID corresponding to one frame into a plurality of section data corresponding to a plurality of sections, may determine whether a dominant color of each section data is within the color conversion region, and may determine whether the dominant color of the input image is within the color conversion region based on the number of section data having the dominant colors within the color conversion region.

When it is decided by the conversion determination module 120 to perform the color conversion and the luminance conversion, or when it is decided by the conversion determination module 120 that the dominant color of the input image is within the color conversion region, the color conversion module 140 may perform the color conversion on pixel data representing the color within the color conversion region among the plurality of pixel data. In some exemplary embodiments, the color conversion module 140 may perform the color conversion by moving the color of the pixel data within the color conversion region toward a target color along a line connecting the color of the pixel data and the target color in a chrominance plane. In other exemplary embodiments, the color conversion module 140 may perform the color conversion by moving the color of the pixel data within the color conversion region in a direction of a vector from a reference color to the target color in the chrominance plane.

The luminance conversion module 160 may perform the luminance conversion on the pixel data on which the color conversion is performed. Thus, the color conversion device 100 may provide output image data OID on which not only the color conversion but also the luminance conversion is performed. When an image having the memory color of the natural object, such as the skin, the grass, the sky, etc., has relatively high lightness, a user may perceive that the image has an improved image quality. Accordingly, the color conversion device 100 may perform not only the color conversion on the image data representing the color within the color conversion region, but also the luminance conversion on the image data on which the color conversion is performed, thereby making the input image more preferred by the user.

The luminance conversion module 160 may not perform the luminance conversion on pixel data representing a luminance within a high luminance region or a low luminance region among the pixel data on which the color conversion is performed, and may perform the luminance conversion only on pixel data representing a luminance within a predetermined middle luminance region among the pixel data on which the color conversion is performed. In some exemplary embodiments, the middle luminance region has a minimum luminance value ranging from a bottom 10% of overall luminance values that the pixel data are able to have to a bottom 20% of the overall luminance values, and a maximum luminance value ranging from a top 10% of the overall luminance values to a top 20% of the overall luminance values, for example. In an exemplary embodiment, in a case where the plurality of pixel data have luminance values ranging from 0 to 255, the minimum luminance value of the middle luminance region may range from 25 to 51, and the maximum luminance value of the middle luminance region may range from 204 to 230, for example. In this case, with respect to the pixel data on which the color conversion is performed, the luminance conversion module 160 may not perform the luminance conversion on the pixel data having a luminance value less than the minimum luminance value of the middle luminance region, may perform the luminance conversion on the pixel data having a luminance value between the minimum luminance value and the maximum luminance value of the middle luminance region, and may not perform the luminance conversion on the pixel data having a luminance value greater than the maximum luminance value of the middle luminance region.

If the luminance conversion is performed in the low luminance region, a contrast ratio of an image may be lowered. The contrast ratio of the image may be calculated as a ratio of an average gray level of a bright portion to an average gray level of a dark portion, for example. When the luminance conversion is performed in the low luminance region, the average gray level of the dark portion may be increased, and thus the contrast ratio of the image may be decreased. Further, when the luminance conversion is performed in the low luminance region, a gray-level banding phenomenon that adjacent gray levels are not distinguished may occur.

Further, also when the luminance conversion is performed in the high luminance region, the gray-level banding phenomenon may occur due to gray-level saturation. When the luminance conversion is performed in the high luminance region, the gray-level saturation phenomenon that some high luminance values are converted to have the same maximum luminance value may occur. When the plurality of pixel data have luminance values ranging from 0 to 255, for example, and the luminance conversion is performed in the high luminance region, luminance values higher than the top 10% of the overall luminance values (e.g., luminance values ranging from 232 to 255) before the luminance conversion may be converted to have the same luminance value of 255 after the luminance conversion. In this case, the gray-level banding phenomenon that adjacent gray levels are not distinguished in the high luminance region may occur.

However, the color conversion device 100 according to exemplary embodiments may perform the luminance conversion only on the pixel data representing the luminance within the middle luminance region among the pixel data on which the color conversion is performed, thereby further improving the image quality by preventing the image quality degradation in the high and low luminance regions.

The luminance conversion module 160 may increase the luminance of the pixel data within the middle luminance region by a luminance increment that gradually changes. In an exemplary embodiment, the luminance increment may gradually increase as the luminance of the pixel data increases from the minimum luminance value of the middle luminance region to a reference luminance value, and may gradually decrease as the luminance of the pixel data increases from the reference luminance value to the maximum luminance value of the middle luminance region, for example. In some exemplary embodiments, the luminance increment may increase linearly proportional to an increment of the luminance of the pixel data as the luminance of the pixel data increases from the minimum luminance value to the reference luminance value, and may decrease linearly proportional to the increment of the luminance of the pixel data as the luminance of the pixel data increases from the reference luminance value to the maximum luminance value. In other exemplary embodiments, the luminance conversion module 160 may nonlinearly increase the luminance of the pixel data such that the luminance increment is nonlinearly proportional to the increment of the luminance of the pixel data.

A conventional color conversion device performs only the color conversion that converts the memory color sensitive to the human eyes into the preferred color. However, as described above, the color conversion device 100 according to exemplary embodiments may perform not only the color conversion but also the luminance conversion, thereby converting the input image into the image that is more preferred by the user. Further, as described above, the color conversion device 100 according to exemplary embodiments may perform the luminance conversion only on the pixel data representing the luminance within the middle luminance region among the pixel data on which the color conversion is performed, thereby further improving the image quality by preventing the image quality degradation in the high and low luminance regions.

Figure 2:
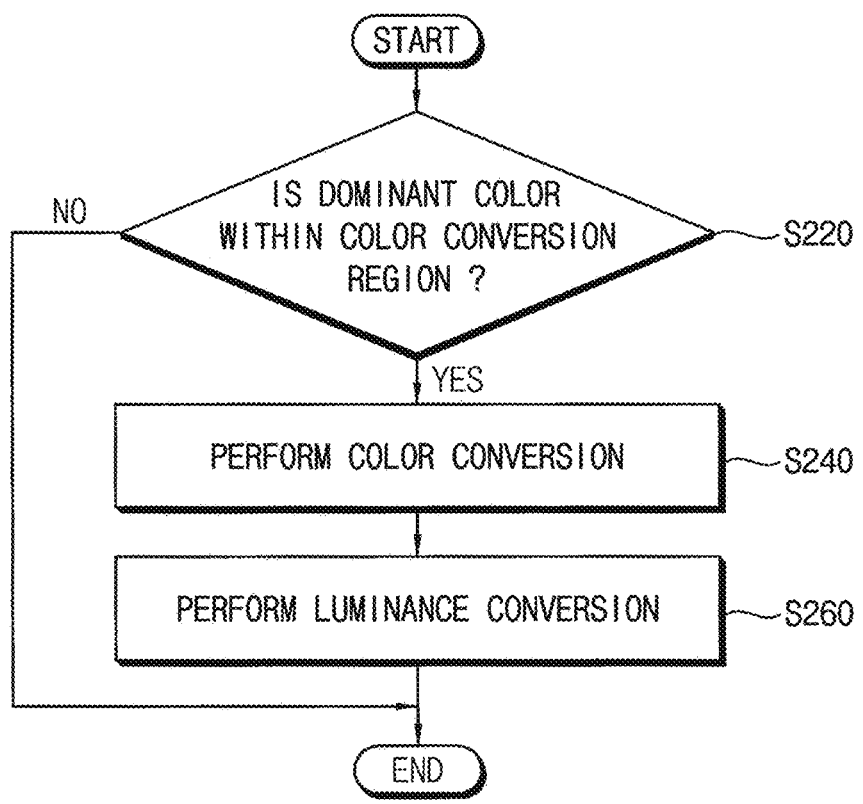
FIG. 2 is a flowchart illustrating an exemplary embodiment of a method of converting a color.

FIG. 2 is a flowchart illustrating a method of converting a color according to exemplary embodiments.

Referring to FIGS. 1 and 2, a conversion determination module 120 may receive input image data IID including a plurality of pixel data, and may determine whether a dominant color of an input image represented by the input image data IID is within a predetermined color conversion region (S220). When the dominant color of the input image is outside the color conversion region (S220: NO), a color conversion device 100 may not perform color conversion and luminance conversion.

When the dominant color of the input image is within the color conversion region (S220: YES), a color conversion module 140 may perform the color conversion on pixel data representing a color within the color conversion region among the plurality of pixel data (S240). A luminance conversion module 160 may perform the luminance conversion on pixel data representing a luminance within a predetermined middle luminance region among the pixel data on which the color conversion is performed (S260).

Accordingly, the method of converting the color according to exemplary embodiments may perform not only the color conversion but also the luminance conversion, thereby making the input image more preferred by the user. Further, the method of converting the color according to exemplary embodiments may perform the luminance conversion only on the pixel data representing the luminance within the middle luminance region among the pixel data on which the color conversion is performed, thereby further improving the image quality by preventing image quality degradation in high and low luminance regions.

Figure 3:
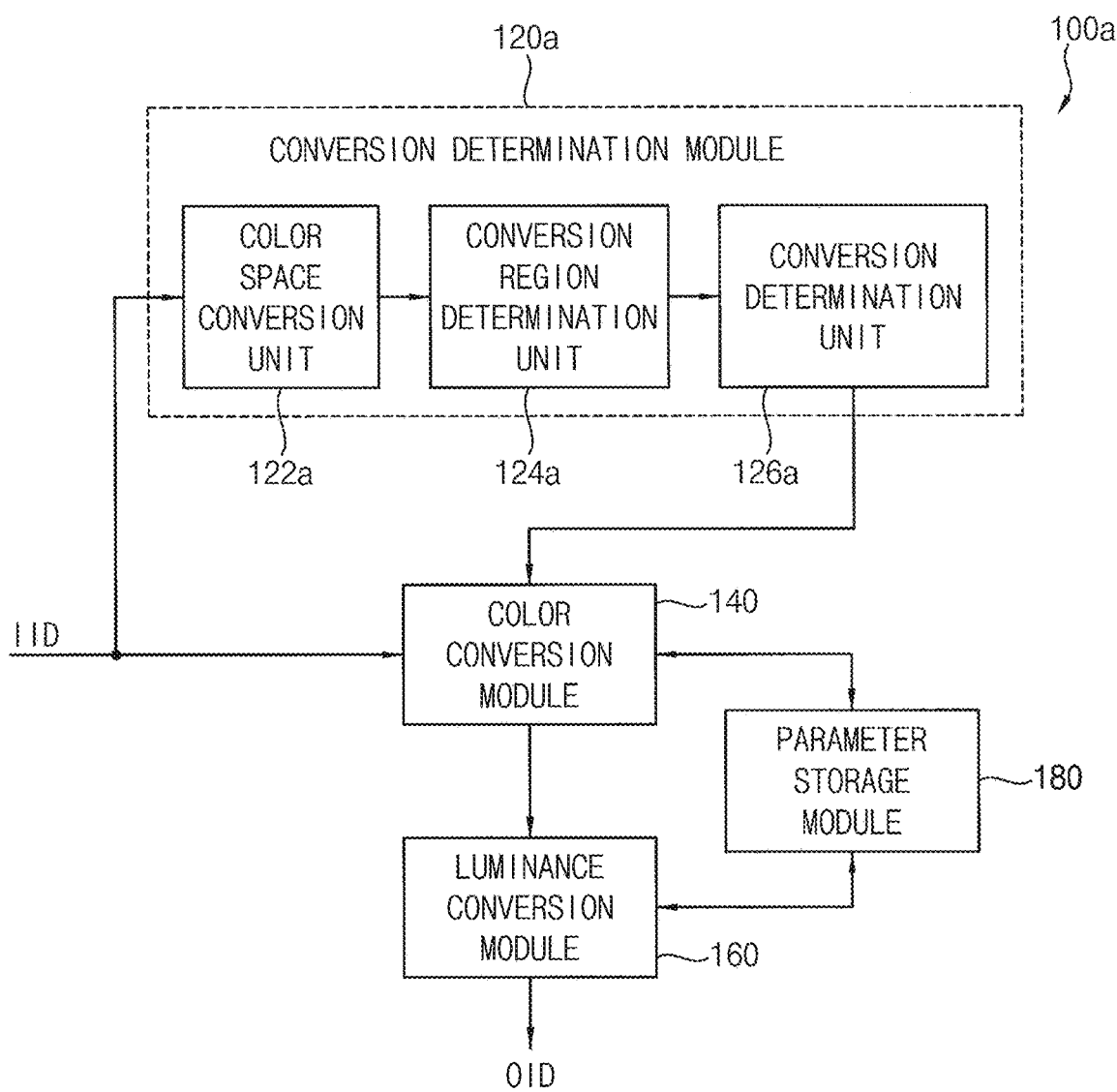
FIG. 3 is a block diagram illustrating an exemplary embodiment of a color conversion device.

FIG. 3 is a block diagram illustrating a color conversion device according to exemplary embodiments.

Referring to FIG. 3, a color conversion device 100a may include a conversion determination module 120a, a color conversion module 140, a luminance conversion module 160 and a parameter storage module 180.

The conversion determination module 120a may receive input image data IID including a plurality of pixel data, determine whether colors represented by the plurality of pixel data are within a color conversion region, and may determine whether to perform color conversion and luminance conversion according to the number of the pixel data representing the colors within the color conversion region. In some exemplary embodiments, to perform these operations, the conversion determination module 120a may include a color space conversion unit 122a that perform color space conversion, a conversion region determination unit 124a that determines whether a color of each pixel data is within the color conversion region, and a conversion determination unit 126a that determines whether to perform the color conversion and the luminance conversion according to the number of the pixel data representing the colors within the color conversion region.

The color space conversion unit 122a may convert the input image data IID or the plurality of pixel data that are first color space data into second color space data including luminance data and color data that are separate from each other. In some exemplary embodiments, the color space conversion unit 122a may convert the input image data IID that are RGB data into YCbCr data including Y data that are the luminance data and CbCr data that are the color data. However, the second color space data may not be limited to the YCbCr data, and may be any color space data where the luminance data and the color data are separate.

The conversion region determination unit 124a may determine whether the colors represented by the plurality of pixel data are within the color conversion region based on the color data (e.g., the CbCr data) of the second color space data (e.g., the YCbCr data). In an example of a color conversion region 310 in a chrominance plane (e.g., a Cb-Cr plane) illustrated in FIG. 5A, when the CbCr data corresponding to each pixel data is within the color conversion region 310, the color of the pixel data may be determined to be within the color conversion region 310.

The conversion determination unit 126a may determine whether a dominant color of an input image represented by the input image data IID is within the color conversion region by comparing the number of pixel data representing the colors within the color conversion region among the plurality of pixel data with a reference pixel number. In an exemplary embodiment, when the number of the pixel data representing the colors within the color conversion is greater than or equal to the reference pixel number, the conversion determination unit 126a may decide that the dominant color of the input image is within the color conversion region, or that the color conversion and the luminance conversion are to be performed, for example.

When the dominant color of the input image is within the color conversion region, or when the number of the pixel data representing the colors within the color conversion is greater than or equal to the reference pixel number, the color conversion module 140 may perform the color conversion on the pixel data representing the colors within the color conversion region. The luminance conversion module 160 may perform the luminance conversion on pixel data representing a luminance within a predetermined middle luminance region among the pixel data on which the color conversion is performed. The parameter storage module 180 may store at least one parameter used in the color conversion and the luminance conversion.

Hereinafter, operations of the color conversion device 100a according to exemplary embodiments will be described below with reference to FIGS. 4 through 8.

Figure 4:
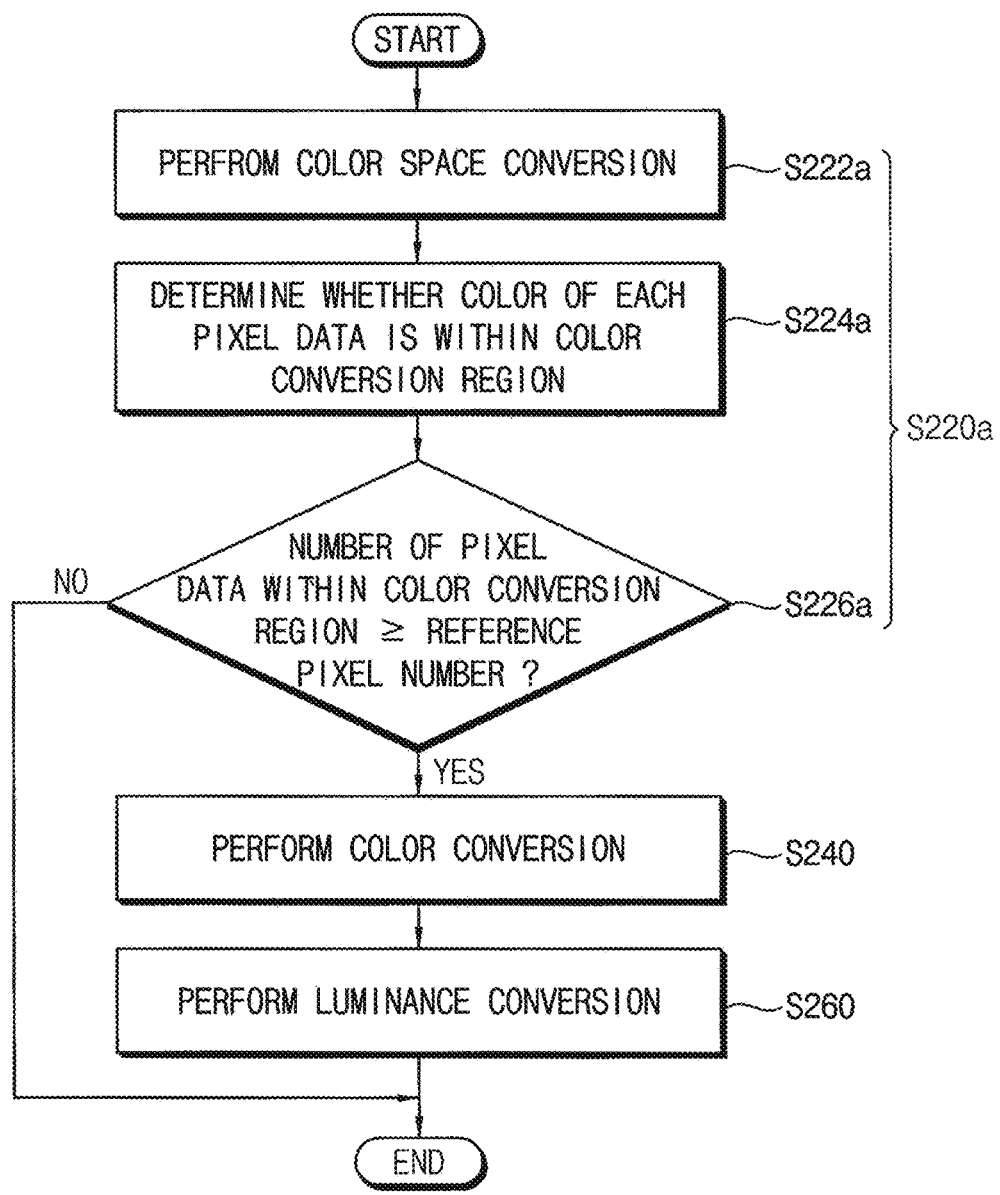
FIG. 4 is a flowchart illustrating an exemplary embodiment of a method of converting a color.
Figure 5A:
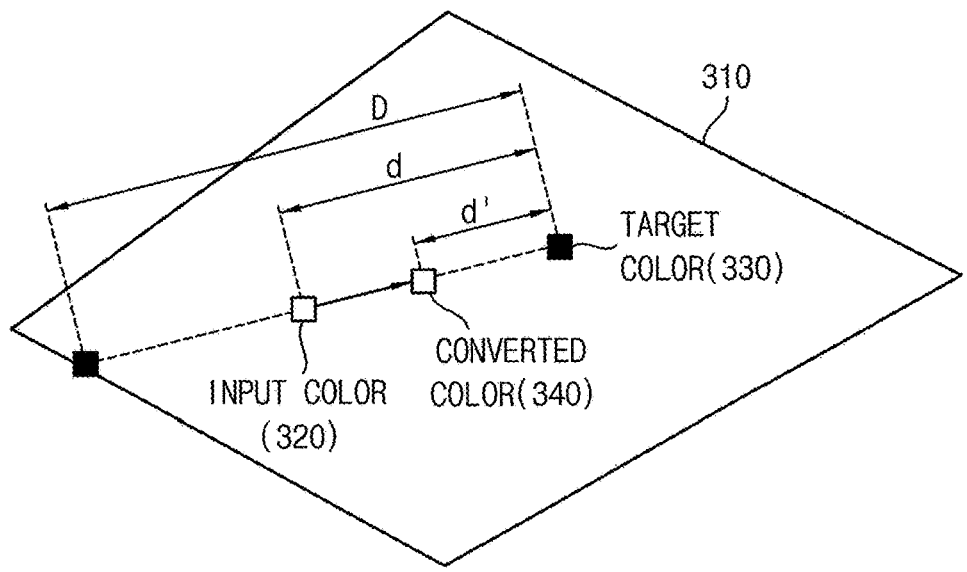
FIGS. 5A and 5B are diagrams for describing an exemplary embodiment of color conversion performed by a color conversion device.
Figure 5B:
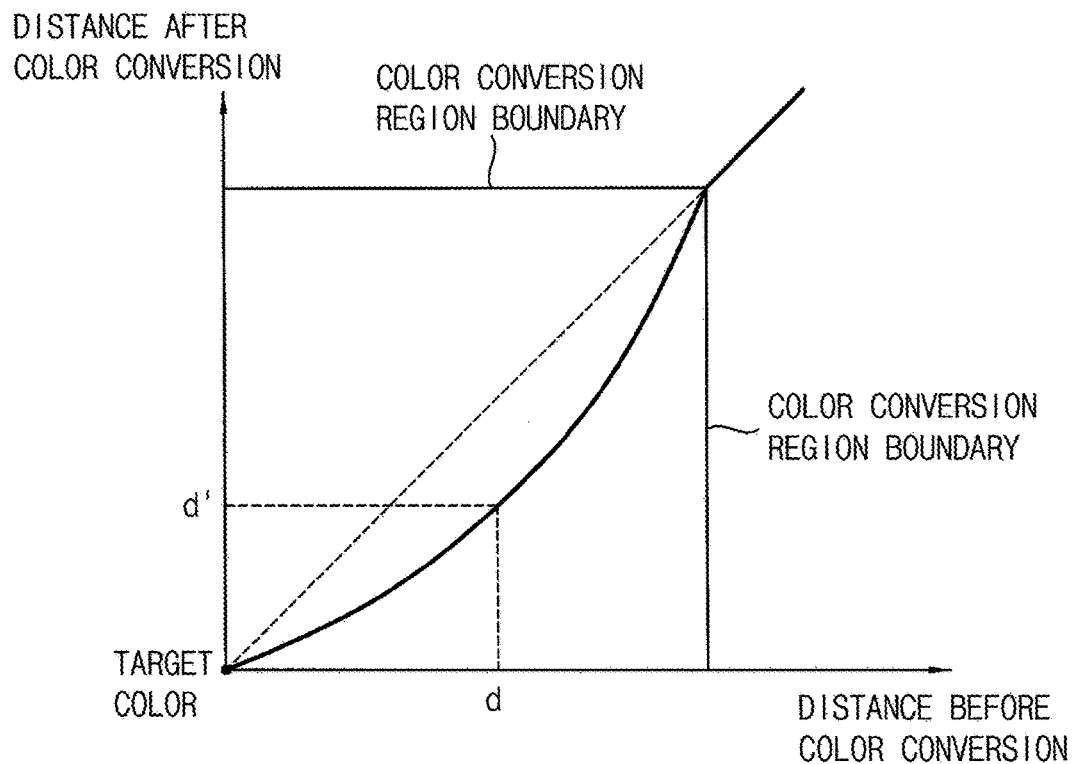
Figure 6:
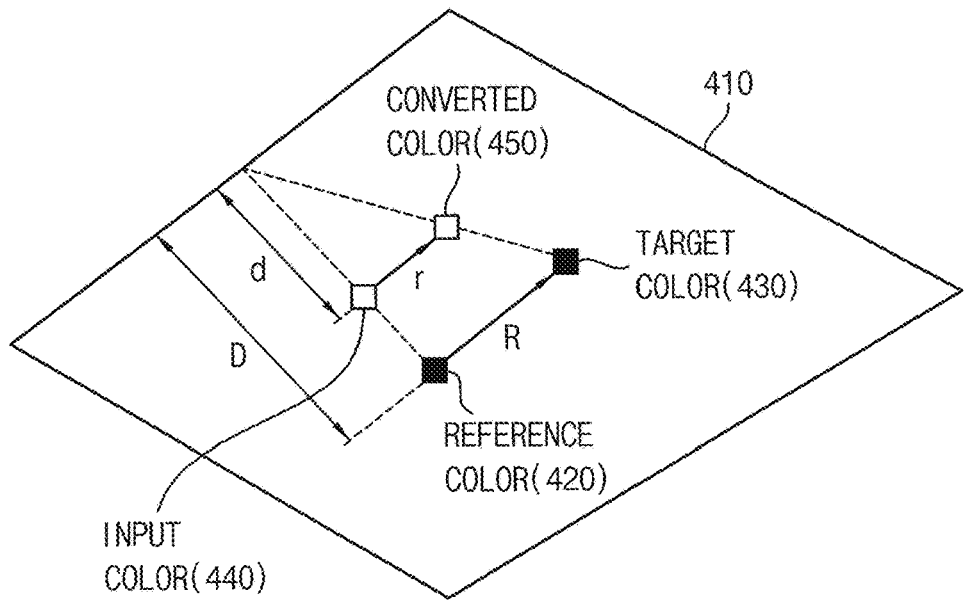
FIG. 6 is a diagram for describing another exemplary embodiment of color conversion performed by a color conversion device.
Figure 7:
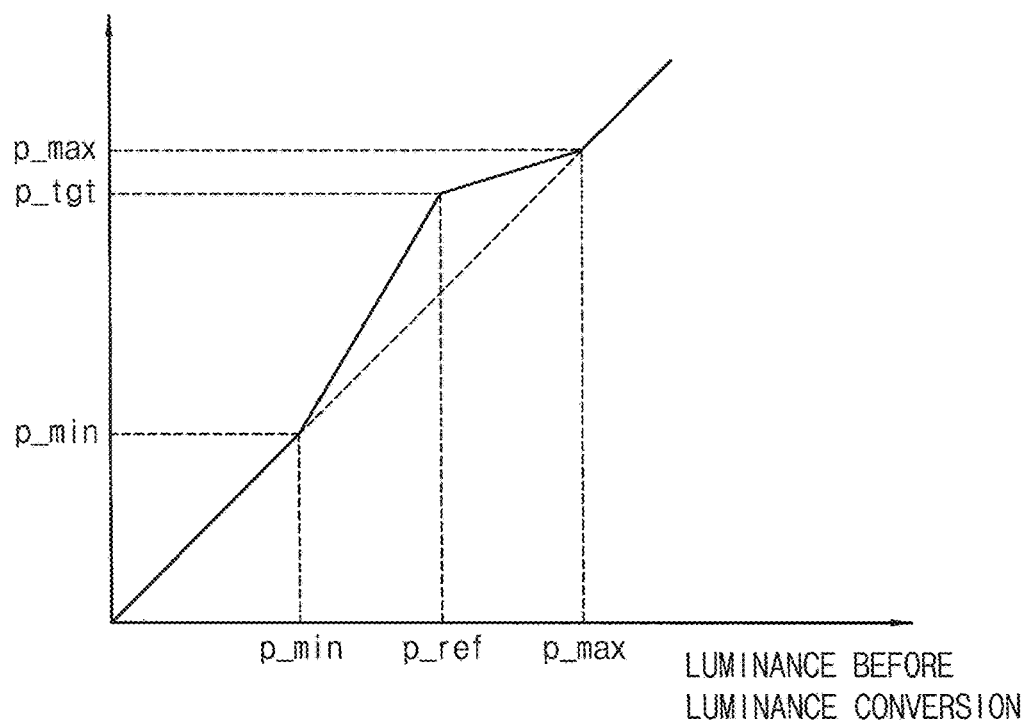
FIG. 7 is a diagram for describing an exemplary embodiment of luminance conversion performed by a color conversion device.
Figure 8:
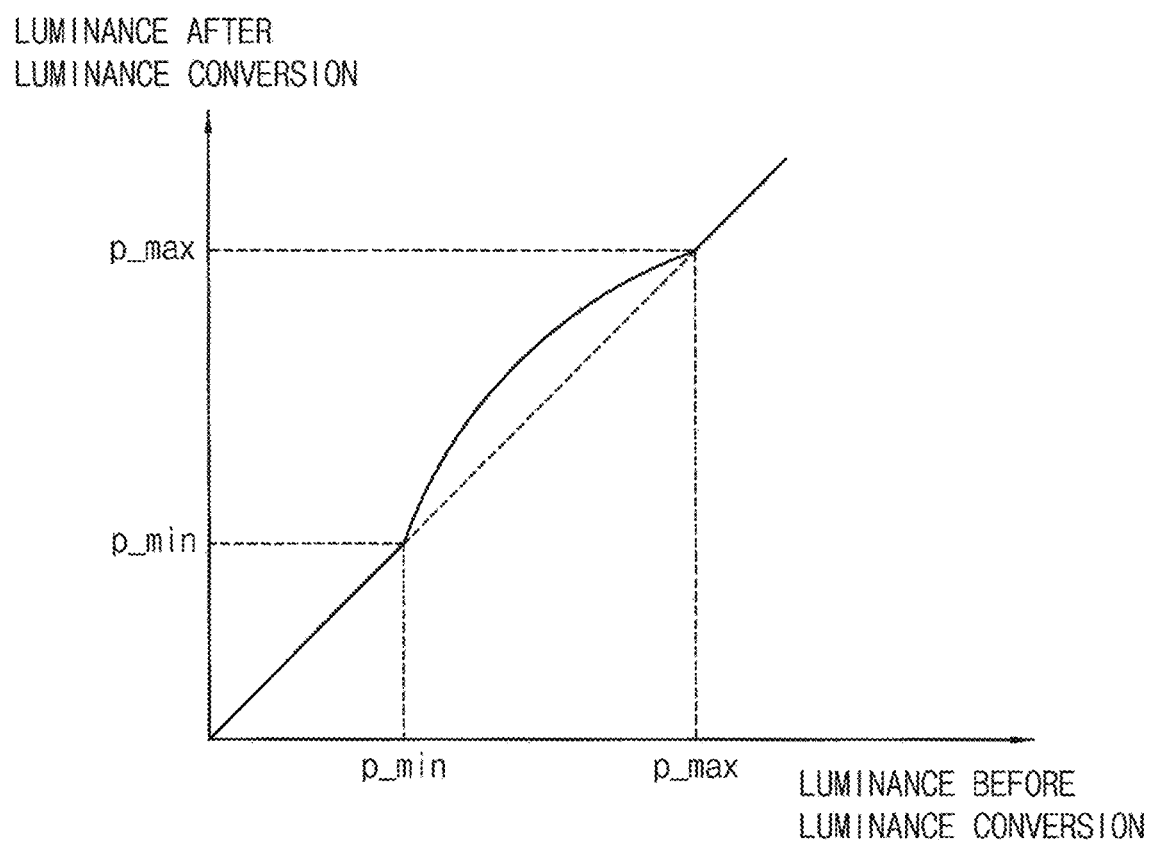
FIG. 8 is a diagram for describing another exemplary embodiment of luminance conversion performed by a color conversion device.

FIG. 4 is a flowchart illustrating a method of converting a color according to exemplary embodiments, FIGS. 5A and 5B are diagrams for describing an example of color conversion performed by a color conversion device according to exemplary embodiments, FIG. 6 is a diagram for describing another example of color conversion performed by a color conversion device according to exemplary embodiments, FIG. 7 is a diagram for describing an example of luminance conversion performed by a color conversion device according to exemplary embodiments, and FIG. 8 is a diagram for describing another example of luminance conversion performed by a color conversion device according to exemplary embodiments.

Referring to FIGS. 3 and 4, to determine whether the dominant color of the input image represented by the input image data IID is within the color conversion region (S220a), the color space conversion unit 122a may convert the plurality of pixel data that are the first color space data (e.g., the RGB data) into the second color space data (e.g., the YCbCr data) including the luminance data and the color data that are separate from each other (S222a), the conversion region determination unit 124a may determine whether the color of each pixel data is within the color conversion region based on the color data (e.g., the CbCr data) of the second color space data (S224a), and the conversion determination unit 126a may determine whether the dominant color of the input image is within the color conversion region by comparing the number of the pixel data representing the colors within the color conversion region with the reference pixel number (S226a). When the number of the pixel data representing the colors within the color conversion region is less than the reference pixel number (S226a: NO), or when the dominant color of the input image is outside the color conversion region, the color conversion device 100a may not perform the color conversion and the luminance conversion.

When the number of the pixel data representing the colors within the color conversion region is greater than or equal to the reference pixel number (S226a: YES), i.e., when the dominant color of the input image is within the color conversion region, the color conversion module 140 may perform the color conversion on the pixel data representing the colors within the color conversion region (S240).

In some exemplary embodiments, the color conversion module 140 may perform the color conversion by moving the color of the pixel data within the color conversion region toward a target color along a line connecting the color of the pixel data and the target color in a chrominance plane (e.g., the Cb-Cr plane). In an exemplary embodiment, as illustrated in FIG. 5A, the color conversion region 310 may be defined as having a diamond shape in the chrominance plane (e.g., the Cb-Cr plane), for example. However, although an example of the diamond-shaped color conversion region 310 is illustrated in FIG. 5A, in some exemplary embodiments, the color conversion region 310 may have any shape, such as a circular shape, an oval shape, a polygonal shape, etc. The color represented by the pixel data, or an input color 320 may be converted into a color 340 relatively close to a target color 330 by moving the input color 320 toward the target color 330 along a line connecting the input color 320 and the target color 330. In an exemplary embodiment, the input color 320 may be converted into the color 340 using a color conversion equation:

$$d' = s*d^2/D + (1-s)*d,$$

where d represents a distance between the input color 320 and the target color 330, d' represents a distance between the converted color 340 and the target color 330, D represents a distance between a boundary of the color conversion region 310 and the target color 330, and s represents a previously set constant parameter ranging from 0 to 1 which may be stored in the parameter storage module 180, for example. As illustrated in FIG. 5B, when the distance d is 0 (or when the input color 320 is located at the same point where the target color 330 is located), or when the distance d is D (or when the input color 320 is located at the boundary of the color conversion region 310), the input color 320 may not be moved. As the distance d increases from 0 to D, a moved distance (d−d') of the input color 320 may gradually increase, and then may gradually decrease.

In other exemplary embodiments, the color conversion module 140 may perform the color conversion by moving the color of the pixel data within the color conversion region in a direction of a vector from a reference color to the target color in the chrominance plane. In an exemplary embodiment, as illustrated in FIG. 6, the color represented by the pixel data, or an input color 440 may be converted into a color 450 relatively close to a target color 430 using a vector r having a direction the same as that of a vector R from a reference color 420 to the target color 430, for example. Further, a magnitude of the vector r from the input color 440 to the converted color 450 may be calculated using an equation:

$$|r| = |R|*d/D,$$

where d represents a distance between a boundary of the color conversion region 410 and the input color 440, D represents a distance between the boundary of the color conversion region 410 and the reference color 420, R represents the vector from the reference color 420 to the target color 430, and r represents the vector from the input color 440 to the converted color 450.

Although FIGS. 5A through 6 illustrate examples of the color conversion performed by the color conversion module 140, the color conversion performed by the color conversion module 140 may not be limited to the examples illustrated in FIGS. 5A through 6.

The luminance conversion module 160 may perform the luminance conversion on the pixel data representing the luminance within the middle luminance region among the pixel data on which the color conversion is performed (S260). In an exemplary embodiment, the luminance conversion module 160 may increase the luminance of the pixel data within the middle luminance region by a luminance increment that gradually increases as the luminance of the pixel data increases from a minimum luminance value of the middle luminance region to a reference luminance value and gradually decreases as the luminance of the pixel data increases from the reference luminance value to a maximum luminance value of the middle luminance region, for example.

In some exemplary embodiments, as illustrated in FIG. 7, the luminance increment that is a difference between the luminance of the pixel data before the luminance conversion and the luminance of the pixel data after the luminance conversion may increase linearly proportional to an increment of the luminance of the pixel data as the luminance of the pixel data increases from the minimum luminance value p_min to the reference luminance value p_ref, and may decrease linearly proportional to the increment of the luminance of the pixel data as the luminance of the pixel data increases from the reference luminance value p_ref to the maximum luminance value p_max. In an exemplary embodiment, when the luminance of the pixel data is less than the minimum luminance value p_min of the middle luminance region, the luminance conversion module 160 may not perform the luminance conversion on the pixel data, for example. When the luminance of the pixel data is greater than or equal to the minimum luminance value p_min and less than the reference luminance value p_ref, the luminance conversion module 160 may increase the luminance of the pixel data using a first luminance conversion equation:

$$y'=\{y*(p\_tgt-p\_min)-p\_min*(p\_tgt-p\_ref)\}/(p\_ref-p\_min).$$

Here, y may represent the luminance of the pixel data before the luminance conversion, y' may represent the luminance of the pixel data after the luminance conversion, p_min may represent the minimum luminance value, p_ref may represent the reference luminance value, and p_tgt may represent a target luminance value of the luminance of the pixel data after the luminance conversion when the luminance of the pixel data before the luminance conversion has the reference luminance value. Further, when the luminance of the pixel data is greater than or equal to the reference luminance value p_ref and less than or equal to the maximum luminance value p_max, the luminance conversion module 160 may increase the luminance of the pixel data using a second luminance conversion equation:

$$y'=\{y*(p\_max-p\_tgt)+p\_max*(p\_tgt-p\_ref)\}/(p\_max-p\_ref).$$

Here, p_max may represent the maximum luminance value. Further, when the luminance of the pixel data is greater than the maximum luminance value p_max, the luminance conversion module 160 may not perform the luminance conversion on the pixel data. In some exemplary embodiments, the minimum luminance value p_min, the maximum luminance value p_max, the reference luminance value p_ref and the target luminance value p_tgt may be previously set parameters that are stored in the parameter storage module 180.

In some exemplary embodiments, the minimum luminance value p_min may range from a bottom 10% of overall luminance values to a bottom 20% of the overall luminance values, and the maximum luminance value p_max may range from a top 10% of the overall luminance values to a top 20% of the overall luminance values. In an exemplary embodiment, in a case where the overall luminance values ranges from 0 to 255, the minimum luminance value p_min may range from 25 to 51, and the maximum luminance value p_max may range from 204 to 230, for example.

In some exemplary embodiments, the reference luminance value p_ref may be set between the minimum luminance value p_min and the maximum luminance value p_max, and the target luminance value p_tgt may be set to be about 15% greater than the reference luminance value p_ref. When the luminance value is excessively increased, a chrominance may be lowered. However, when the luminance value is increased up to about 15%, the pixel data may have a color substantially the same as that of the case where R data, G data and B data are increased with the same ratio, and the chrominance may not be substantially lowered or may be lowered by an amount that is not perceived by a user.

Further, in some exemplary embodiments, the luminance conversion module 160 may apply a weight to the luminance increment (i.e., y'-y) calculated by the first luminance conversion equation or the second luminance conversion equation. In an exemplary embodiment, the luminance conversion module 160 may increase the luminance of the pixel data by applying the weight to the luminance increment using a weighting equation:

$$Y=y+\text{weight}*(y'-y),$$

where Y represents the luminance of the pixel data after the weight is applied, for example. In an exemplary embodiment, when the weight for the luminance increment is 0.5, the luminance conversion module 160 may increase the luminance of the pixel data by a half of the luminance increment (i.e., y'-y) calculated by the first luminance conversion equation or the second luminance conversion equation, for example. In some exemplary embodiments, the weight for the luminance increment may be, but not limited to, a previously set constant ranging from 0 to 1, and may be stored in the parameter storage module 180. In other exemplary embodiments, the weight for the luminance increment may be determined in proportion to an amount of the color conversion for the pixel data. First pixel data that are color-converted by a relatively large amount, or the first pixel data representing an input color 320 having a relatively long moved distance (d–d') in an example of FIGS. 5A and 5B may have a relatively large weight, and second pixel data that are color-converted by a relatively small amount, or the second pixel data representing an input color 320 having a relatively short moved distance (d–d') in an example of FIGS. 5A and 5B may have a relatively small weight.

In other exemplary embodiments, as illustrated in FIG. 8, the luminance increment may increase nonlinearly proportional to the increment of the luminance of the pixel data, and then may increase nonlinearly proportional to the increment of the luminance of the pixel data. In some exemplary embodiments, the luminance conversion module 180 may increase the luminance of the pixel data within the middle luminance region using a luminance conversion equation that is a quadric function. In an exemplary embodiment, the luminance conversion equation may be:

$$y'=p\_coef*y^2+(1-p\_coef*p\_max-p\_coef*p\_min)*y+p\_coef*p\_max*p\_min,$$

where y may represent the luminance of the pixel data before the luminance conversion, y' may represent the luminance of the pixel data after the luminance conversion, p_min may represent the minimum luminance value, p_max may represent the maximum luminance value, and p_coef may represent a coefficient parameter, for example. In some exemplary embodiments, the minimum luminance value p_min, the maximum luminance value p_max and the coefficient parameter p_coef may be previously set parameters that are stored in the parameter storage module 180. Further, in some exemplary embodiments, the luminance conversion module 160 may apply the weight to the luminance increment (i.e., y'−y) calculated by the luminance conversion equation.

As described above, the color conversion device 100a according to exemplary embodiments may perform not only the color conversion but also the luminance conversion, thereby converting the input image into the image that is more preferred by the user. Further, as described above, the color conversion device 100a according to exemplary embodiments may perform the luminance conversion only on the pixel data representing the luminance within the middle luminance region among the pixel data on which the color conversion is performed, thereby further improving the image quality by preventing the image quality degradation in the high and low luminance regions.

Figure 9:
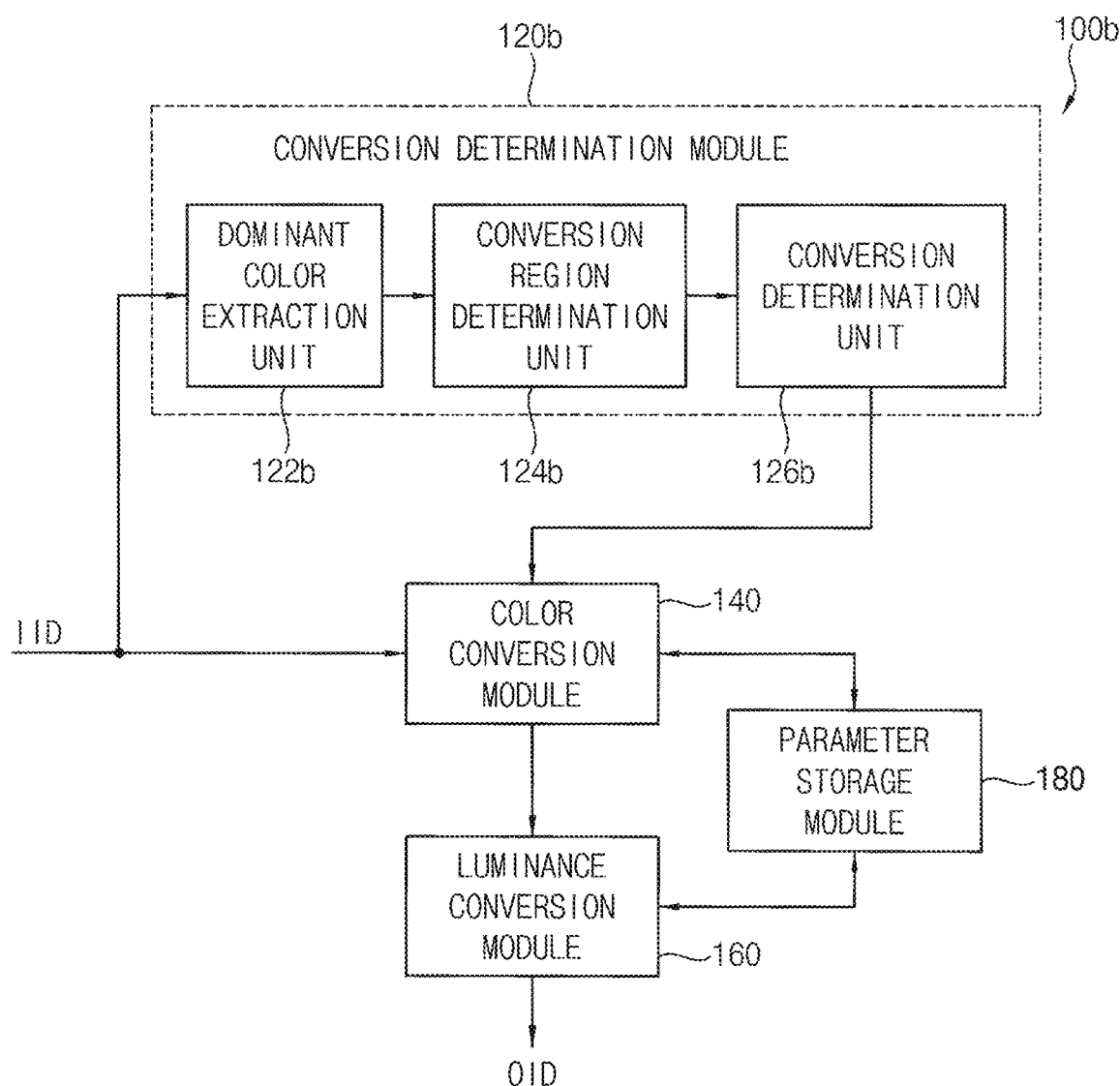
FIG. 9 is a block diagram illustrating an exemplary embodiment of a color conversion device.

FIG. 9 is a block diagram illustrating a color conversion device according to exemplary embodiments.

Referring to FIG. 9, a color conversion device 100b may include a conversion determination module 120b, a color conversion module 140, a luminance conversion module 160 and a parameter storage module 180. The color conversion device 100b of FIG. 9 may have a similar configuration and a similar operation to a color conversion device 100a of FIG. 3, except for a configuration and an operation of the conversion determination module 120b.

The conversion determination module 120b may divide input image data IID corresponding to one frame into a plurality of section data corresponding to a plurality of sections, may extract respective dominant colors of the plurality of section data, may determine whether the respective dominant colors of the plurality of section data are within a color conversion region, and may determine whether to perform color conversion and luminance conversion according to the number of section data having the dominant colors within the color conversion region. In some exemplary embodiments, to perform these operations, the conversion determination module 120b may include a dominant color extraction unit 122b, a conversion region determination unit 124b and a conversion determination unit 126b.

The dominant color extraction unit 122b may divide the input image data IID corresponding to one frame into the plurality of section data corresponding to the plurality of sections, and may extract the respective dominant colors of the plurality of section data. In an exemplary embodiment, the dominant color extraction unit 122b may divide one frame into the plurality of sections that are arranged in a matrix form having a plurality of rows and a plurality of rows, and may divide the input image data IID into the plurality of section data corresponding to the plurality of sections, for example. Each section may correspond to a plurality of pixels, and each section data may include a plurality of pixel data. In some exemplary embodiments, the dominant color extraction unit 122b may convert the plurality of pixel data included in each section data into lightness, chroma and hue ("LCH") data, and may extract the dominant color of the section data by analyzing a color distribution represented by H data of the LCH data. In other exemplary embodiments, the dominant color extraction unit 122b may convert the plurality of pixel data included in each section data into YCbCr data, and may extract the dominant color of the section data by analyzing a color distribution represented by CbCr data of the YCbCr data.

The conversion region determination unit 124b may determine whether the respective dominant colors of the plurality of section data are within the color conversion region, and the conversion determination unit 126b may determine whether a dominant color of an input image represented by the input image data IID is within the color conversion region by comparing the number of the section data representing the respective dominant colors within the color conversion region with a reference section number. In an exemplary embodiment, when the number of the section data representing the respective dominant colors within the color conversion region is greater than or equal to the reference section number, the conversion determination unit 126b may decide that the dominant color of the input image is within the color conversion region, or that the color conversion and the luminance conversion are to be performed, for example.

Hereinafter, operations of the color conversion device 100b according to exemplary embodiments will be described below with reference to FIGS. 9 and 10.

Figure 10:
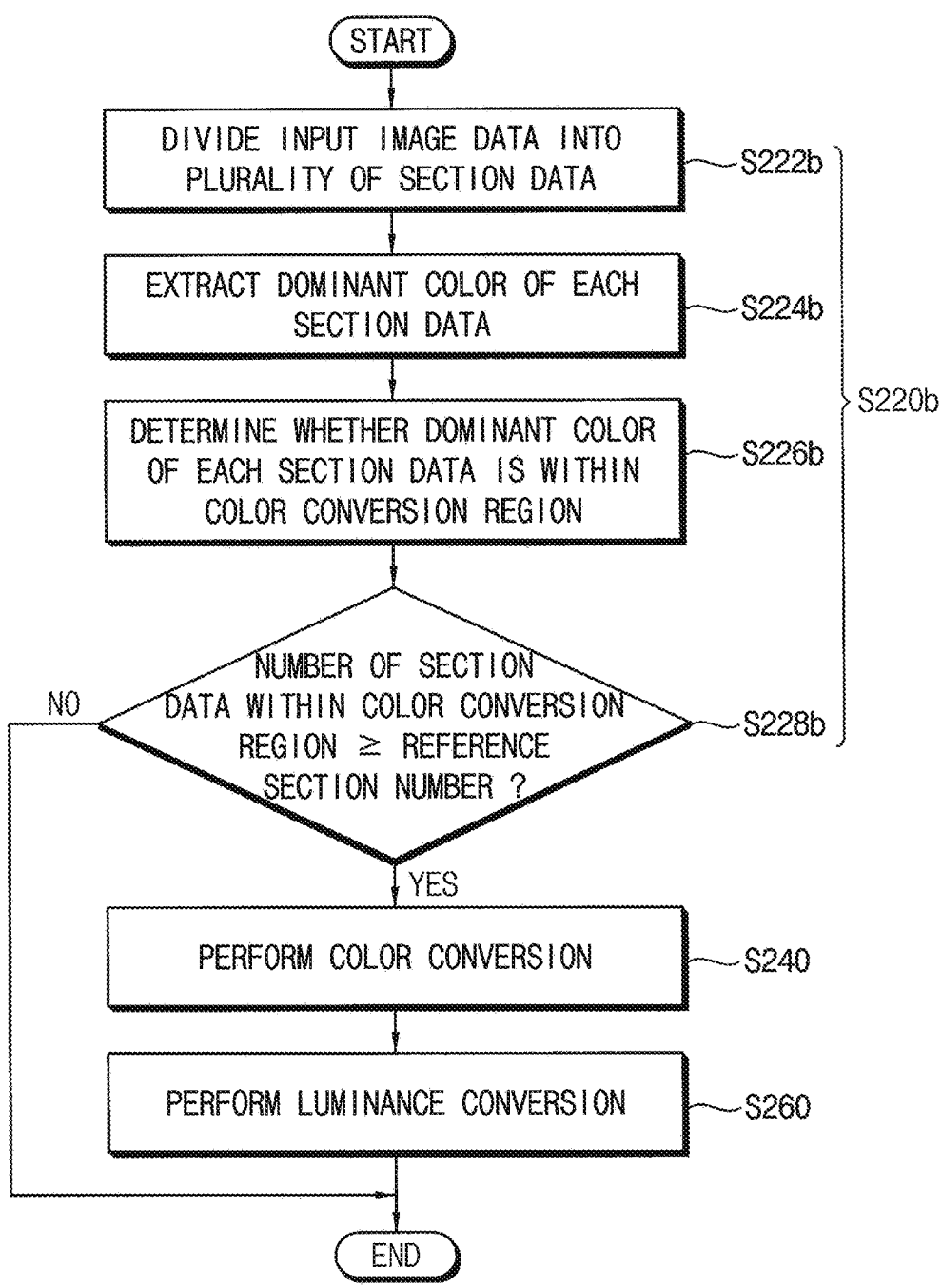
FIG. 10 is a flowchart illustrating an exemplary embodiment of a method of converting a color.

Referring to FIGS. 9 and 10, to determine whether the dominant color of the input image represented by the input image data IID is within the color conversion region (S220b), the dominant color extraction unit 122b may divide the input image data IID corresponding to one frame into the plurality of section data corresponding to the plurality of sections (S222b), and may extract the respective dominant colors of the plurality of section data (S224b). The conversion region determination unit 124b may determine whether the dominant color of each section data is within the color conversion region (S226b), and the conversion determination unit 126b may determine whether the dominant color of the input image is within the color conversion region by comparing the number of the section data representing the respective dominant colors within the color conversion region with the reference section number (S228b). When the number of the section data representing the respective dominant colors within the color conversion region is less than the reference section number (S228: NO), or when the dominant color of the input image is outside the color conversion region, the color conversion device 100b may not perform the color conversion and the luminance conversion.

If the number of the section data representing the respective dominant colors within the color conversion region is greater than or equal to the reference section number (S228b: YES), i.e., when the dominant color of the input image is within the color conversion region, the color conversion module 140 may perform the color conversion on the pixel data representing the colors within the color conversion region (S240). Further, the luminance conversion module 160 may perform the luminance conversion on the pixel data representing the luminance within the middle luminance region among the pixel data on which the color conversion is performed (S260).

As described above, the color conversion device 100b according to exemplary embodiments may perform not only the color conversion but also the luminance conversion, thereby converting the input image into the image that is more preferred by the user. Further, as described above, the color conversion device 100b according to exemplary embodiments may perform the luminance conversion only on the pixel data representing the luminance within the middle luminance region among the pixel data on which the color conversion is performed, thereby further improving the image quality by preventing the image quality degradation in the high and low luminance regions.

Figure 11:
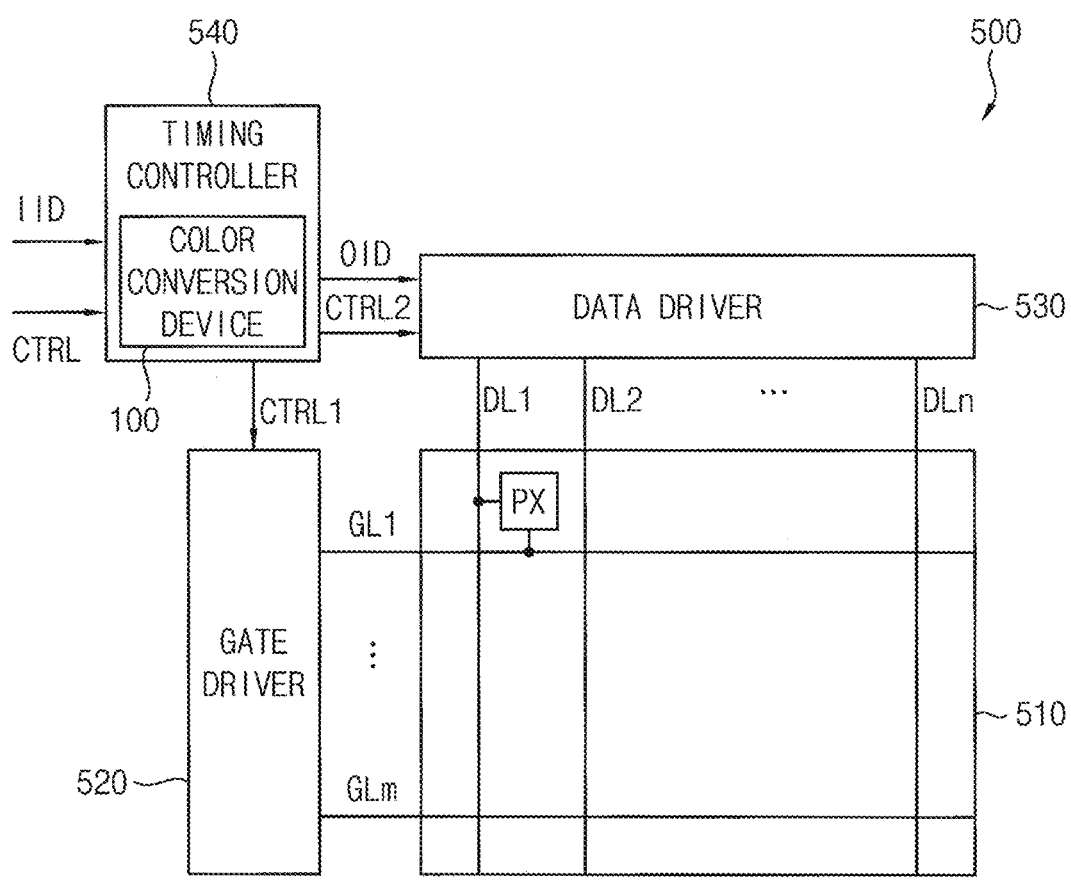
FIG. 11 is a block diagram illustrating an exemplary embodiment of a display device including a color conversion device.

FIG. 11 is a block diagram illustrating a display device including a color conversion device according to exemplary embodiments.

Referring to FIG. 11, a display device 500 may include a display panel 510 including a plurality of pixels PX, a gate driver 520 that provides gate signals to the plurality of pixels PX, a data driver 530 that provides data signals to the plurality of pixels PX, and a timing controller 540 that controls the gate driver 520 and the data driver 530.

The display panel 510 may include a plurality of gate lines GL1 and GLm, a plurality of data lines DL1, DL2 and DLn, where m and n are natural numbers, and the plurality of pixels PX connected to the plurality of gate lines GL1 and GLm and the plurality of data lines DL1, DL2 and DLn. In some exemplary embodiments, the display panel 510 may be an organic light emitting diode ("OLED") display panel. In other exemplary embodiments, the display panel 510 may be a liquid crystal display ("LCD") panel. However, the display panel 510 may not be limited to the OLED display panel and the LCD panel, and may be any display panel.

The gate driver 520 may generate the gate signals based on a gate control signal CTRL1 from the timing controller 540, and may sequentially apply the gate signals to the gate lines GL1 and GLm. In some exemplary embodiments, the gate control signal CTRL1 may include, but not limited to, a gate clock signal and a scan start pulse. According to exemplary embodiments, the gate driver 520 may be disposed (e.g., mounted) directly on the display panel 510, may be connected to the display panel 510 in a form of a tape carrier package ("TCP"), or may be integrated in a peripheral portion of the display panel 510.

The data driver 530 may generate the data signal that are analog data voltages based on output image data OID that are digital data and a data control signal CTRL2 from the timing controller 540, and may apply the data signals to the data lines DL1, DL2 and DLn. In some exemplary embodiments, the data control signal CTRL2 may include, but not limited to, a horizontal start signal and a load signal. According to exemplary embodiments, the data driver 530 may be disposed (e.g., mounted) directly on the display panel 510, may be connected to the display panel 510 in a form of a TCP, or may be integrated in a peripheral portion of the display panel 510.

The timing controller 540 may receive input image data IID and an input control signal CTRL from an external host (e.g., a graphic processing unit ("GPU")). In some exemplary embodiments, the input image data IID may include red image data, green image data and blue image data. In some exemplary embodiments, the input control signal CTRL may include, but not limited to, a data enable signal, a vertical synchronization signal, a horizontal synchronization signal and a master clock signal. The timing controller 540 may generate the gate control signal CTRL1, the data control signal CTRL2 and the output image data OID based on the input image data IID and the input control signal CTRL. The timing controller 540 may control the operation of the gate driver 520 by providing the gate control signal CTRL1 to the gate driver 520, and may control the operation of the data driver 530 by providing the output image data OID and the data control signal CTRL2 to the data driver 530.

The timing controller 540 may include a color conversion device 100 that generates the output image data OID by performing color conversion and luminance conversion on the input image data IID. The color conversion device 100 may include a conversion determination module that receives the input image data IID including a plurality of pixel data, and determines whether a dominant color of an input image represented by the input image data IID is within a predetermined color conversion region, a color conversion module that performs the color conversion on pixel data representing a color within the color conversion region among the plurality of pixel data when the dominant color of the input image is within the color conversion region, and a luminance conversion module that performs the luminance conversion on pixel data representing a luminance within a predetermined middle luminance region among the pixel data on which the color conversion is performed.

Accordingly, the color conversion device 100 and the display device 500 including the color conversion device 100 according to exemplary embodiments may perform not only the color conversion but also the luminance conversion, thereby making the input image more preferred by a user. Further, the color conversion device 100 and the display device 500 including the color conversion device 100 according to exemplary embodiments may perform the luminance conversion only on the pixel data representing the luminance within the middle luminance region among the pixel data on which the color conversion is performed, thereby further improving the image quality by preventing image quality degradation in high and low luminance regions.

Exemplary embodiments of the invention may be applied to any display device and any electronic device including the display device. Exemplary embodiments of the invention may be applied to various devices such as a television ("TV"), a digital TV, a three-dimensional ("3D") TV, a smart phone, a mobile phone, a tablet computer, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A color conversion device comprising:
   a conversion determination module which receives input image data including a plurality of pixel data, and determines whether a dominant color of an input image represented by the input image data is within a predetermined color conversion region;
   a color conversion module which performs color conversion on pixel data representing a color within the color conversion region among the plurality of pixel data only when the dominant color of the input image is within the color conversion region; and
   a luminance conversion module which performs luminance conversion on pixel data representing a luminance only within a predetermined middle luminance region among the pixel data on which the color conversion is performed.

2. The color conversion device of claim 1, wherein the luminance conversion module does not perform the luminance conversion on pixel data representing a luminance within a high luminance region or a low luminance region among the pixel data on which the color conversion is performed.

3. The color conversion device of claim 1, wherein the predetermined middle luminance region has a minimum luminance value ranging from a bottom 10% of overall luminance values to a bottom 20% of the overall luminance values, and a maximum luminance value ranging from a top 10% of the overall luminance values to a top 20% of the overall luminance values.

4. The color conversion device of claim 1, wherein the luminance conversion module increases a luminance of the pixel data within the predetermined middle luminance region by a luminance increment which gradually increases as the luminance of the pixel data increases from a minimum luminance value of the predetermined middle luminance region to a reference luminance value and gradually decreases as the luminance of the pixel data increases from the reference luminance value to a maximum luminance value of the predetermined middle luminance region.

5. The color conversion device of claim 4, wherein the luminance increment increases linearly proportional to an increment of the luminance of the pixel data as the luminance of the pixel data increases from the minimum luminance value to the reference luminance value, and decreases linearly proportional to the increment of the luminance of the pixel data as the luminance of the pixel data increases from the reference luminance value to the maximum luminance value.

6. The color conversion device of claim 1, wherein the luminance conversion module increases a luminance of the pixel data within the predetermined middle luminance region using a first luminance conversion equation:

$$y'=\{y*(p\_tgt-p\_min)-p\_min*(p\_tgt-p\_ref)\}/(p\_ref-p\_min),$$

when the luminance of the pixel data is greater than or equal to a minimum luminance value of the predetermined middle luminance region and less than a reference luminance value, where y represents the luminance of the pixel data before the luminance conversion, y' represents the luminance of the pixel data after the luminance conversion, p_min represents the minimum luminance value, p_ref represents the reference luminance value, and p_tgt represents a target luminance value of the luminance of the pixel data after the luminance conversion when the luminance of the pixel data before the luminance conversion has the reference luminance value, and wherein the luminance conversion module increases the luminance of the pixel data within the predetermined middle luminance region using a second luminance conversion equation:

$$y'=\{y*(p\_max-p\_tgt)+p\_max*(p\_tgt-p\_ref)\}/(p\_max-p\_ref),$$

when the luminance of the pixel data is greater than or equal to the reference luminance value and less than or equal to a maximum luminance value of the predetermined middle luminance region, where p_max represents the maximum luminance value.

7. The color conversion device of claim 6, wherein the luminance conversion module increases the luminance of the pixel data by applying a weight to a luminance increment according to the first luminance conversion equation or the second luminance conversion equation using a weighting equation:

$$Y=y+\text{weight}*(y'-y),$$

where Y represents the luminance of the pixel data after the weight is applied.

8. The color conversion device of claim 7, wherein the weight for the luminance increment is a previously set constant.

9. The color conversion device of claim 7, wherein the weight for the luminance increment is determined in proportion to an amount of the color conversion for the pixel data.

10. The color conversion device of claim 1, wherein the luminance conversion module increases a luminance of the pixel data within the predetermined middle luminance region using a luminance conversion equation which is a quadric function.

11. The color conversion device of claim 10, wherein the luminance conversion equation is:

$$y'=p\_coef*y^2+(1-p\_coef*p\_max-p\_coef*p\_min)*y+p\_coef*p\_max*p\_min,$$

where y represents the luminance of the pixel data before the luminance conversion, y' represents the luminance of the pixel data after the luminance conversion, p_min represents a minimum luminance value of the predetermined middle luminance region, p_max represents a maximum luminance value of the predetermined middle luminance region, and p_coef represents a coefficient parameter.

12. The color conversion device of claim 1, wherein the conversion determination module determines whether colors represented by the plurality of pixel data are within the color conversion region, compares a number of pixel data representing the colors within the color conversion region among the plurality of pixel data with a reference pixel number, and determines that the dominant color of the input image is within the color conversion region when the number of pixel data is greater than or equal to the reference pixel number.

13. The color conversion device of claim 1, wherein the conversion determination module includes:
    a color space conversion unit which converts the plurality of pixel data which are first color space data into second color space data including luminance data and color data which are separate from each other;
    a conversion region determination unit which determines whether colors represented by the plurality of pixel data are within the color conversion region based on the color data of the second color space data; and
    a conversion determination unit which determines whether the dominant color of the input image is within the color conversion region by comparing a number of pixel data representing the colors within the color conversion region among the plurality of pixel data with a reference pixel number.

14. The color conversion device of claim 1, wherein the conversion determination module divides the input image data corresponding to one frame into a plurality of section data corresponding to a plurality of sections, extracts respective dominant colors of the plurality of section data, determines whether the respective dominant colors of the plurality of section data are within the color conversion region, compares a number of section data representing the respective dominant colors within the color conversion region among the plurality of section data with a reference section number, and determines that the dominant color of the input image is within the color conversion region when the number of section data is greater than or equal to the reference section number.

15. The color conversion device of claim 1, wherein the conversion determination module includes:
- a dominant color extraction unit which divides the input image data corresponding to one frame into a plurality of section data corresponding to a plurality of sections, and extracts respective dominant colors of the plurality of section data;
- a conversion region determination unit which determines whether the respective dominant colors of the plurality of section data are within the color conversion region; and
- a conversion determination unit which determines whether the dominant color of the input image is within the color conversion region by comparing a number of section data representing the respective dominant colors within the color conversion region among the plurality of section data with a reference section number.

16. The color conversion device of claim 1, wherein the color conversion module performs the color conversion by moving the color of the pixel data within the color conversion region toward a target color along a line connecting the color of the pixel data and the target color in a chrominance plane.

17. The color conversion device of claim 1, wherein the color conversion module performs the color conversion by moving the color of the pixel data within the color conversion region in a direction of a vector from a reference color to a target color in a chrominance plane.

18. The color conversion device of claim 1, further comprising:
- a parameter storage module which stores at least one parameter used in the color conversion and the luminance conversion.

19. A display device comprising:
- a display panel including a plurality of pixels;
- a data driver which provides data signals to the plurality of pixels;
- a gate driver which provides gate signals to the plurality of pixels; and
- a timing controller which controls the data driver and the gate driver, the timing controller including a color conversion device which comprises:
  - a conversion determination module which receives input image data including a plurality of pixel data, and determines whether a dominant color of an input image represented by the input image data is within a predetermined color conversion region;
  - a color conversion module which performs color conversion on pixel data representing a color within the predetermined color conversion region among the plurality of pixel data only when the dominant color of the input image is within the predetermined color conversion region; and
  - a luminance conversion module which performs luminance conversion on pixel data representing a luminance only within a predetermined middle luminance region among the pixel data on which the color conversion is performed.

20. A method of converting a color, the method comprising:
- determining whether a dominant color of an input image represented by input image data including a plurality of pixel data is within a predetermined color conversion region;
- performing color conversion on pixel data representing a color within the predetermined color conversion region among the plurality of pixel data only when the dominant color of the input image is within the predetermined color conversion region; and
- performing luminance conversion on pixel data representing a luminance only within a predetermined middle luminance region among the pixel data on which the color conversion is performed.

* * * * *